(12) United States Patent
Wagner

(10) Patent No.: US 6,301,515 B1
(45) Date of Patent: Oct. 9, 2001

(54) SYSTEM FOR ESTABLISHING OPTIMAL CRITICAL CHARACTERISTICS OF MANUFACTURED PRODUCTS

(75) Inventor: Glenn W. Wagner, Morton, IL (US)

(73) Assignee: TMMM, Ltd., Morton, IL (US)

( * ) Notice: Subject to any disclaimer, the term of this patent is extended or adjusted under 35 U.S.C. 154(b) by 0 days.

(21) Appl. No.: 09/056,516

(22) Filed: Apr. 7, 1998

(51) Int. Cl.⁷ .................................................. G06F 19/00
(52) U.S. Cl. ................................. 700/109; 702/84; 702/82
(58) Field of Search .............................. 700/95, 97, 103, 700/105, 106, 108, 109, 110; 702/82, 84

(56) References Cited

U.S. PATENT DOCUMENTS

| | | | | |
|---|---|---|---|---|
| 4,700,311 | * | 10/1987 | Tributsch | 364/468 |
| 5,357,439 | * | 10/1994 | Matsuzaki | 364/468 |
| 5,440,478 | * | 8/1995 | Fisher | 364/188 |
| 5,737,581 | * | 4/1998 | Keane | 395/500 |
| 5,765,137 | * | 6/1998 | Lee | 705/7 |
| 5,787,021 | * | 7/1998 | Samaha | 364/552 |
| 5,815,397 | * | 9/1998 | Saito | 364/475.09 |
| 5,896,294 | * | 4/1999 | Chow | 364/468.28 |

\* cited by examiner

*Primary Examiner*—Joseph E. Palys
*Assistant Examiner*—Ronald D Hartman, Jr.
(74) *Attorney, Agent, or Firm*—Husch & Eppenberger, LLC; Robert E. Muir; Kevin M. Kercher

(57) ABSTRACT

A manufacturing process for establishing optimal operating limits, which are a percentage of a specified or blue-print tolerance, for the critical characteristics of manufactured products. The process begins a selection step for establishing an operating range based upon a percentage of tolerance for the critical characteristics of the manufactured product. The next step of the process is the manufacturing step including; making a determination as to whether the manufacturing apparatus is capable of operating within the proposed operating range, evaluating the fitness of the materials, manufacturing the products within the proposed operating range, and measuring the critical characteristics of the manufactured products. The process is audited to verify that product critical characteristics are maintained within the operating range. Any products whose critical characteristics are not within the operating range is rejected and is not offered for sale to customers in the relevant market. The operating range is continuously reassessed to ensure its limits are at the optimal level to meet the quality and cost demands of the customers in the relevant market.

27 Claims, 3 Drawing Sheets

SYSTEM FOR ESTABLISHING OPTIMAL CRITICAL CHARACTERISTICS OF MANUFACTURED PRODUCTS

BACKGROUND OF THE INVENTION

The present invention relates generally to manufacturing processes and, more particularly, to a manufacturing process that uses statistics to establish optimal limits for the critical characteristics of manufactured products.

The process of manufacturing a product presents many challenges to bringing the product to market for the least cost, while maintaining product quality. Manufacturing quality products for the least possible cost is a universal objective in all industries. In order to produce high quality products while maintaining low production costs, it is necessary for the manufacturer to continually assess product quality and process capability.

Many industrial concerns use statistics as a means to improve the quality and the efficiency of their manufacturing processes. The two most common ways of viewing quality are the "traditional approach," which views quality in terms of conformance to product specification and the "new approach," which views quality in terms of reduced variability around a target or nominal critical characteristic. These approaches assume that quality is measured by the variation of critical characteristics from a target or nominal value. However, these approaches are flawed to the extent that they fail to consider the influence that market factors have on manufacturing costs and profitability. A continuous pursuit of excellence or perfection, without regard to customer needs, the expense of achieving quality beyond what the relevant market demands, or the quality and price of the competitors' products is characteristic of both the "traditional" approach and the "new" approach. As a result these two approaches generally lead to the manufacture of products that exceed the needs of the customer and exceed the cost many customers are willing to pay.

The present invention differs from the approaches to quality well known in the art, which use upper and lower control limits to determine whether critical characteristics of a manufactured product are outside of a rule of order, signifying that a process is out of control or unable to consistently perform within a particularly degree of variability. The present invention is unique in that its purpose is to define an operating range to be used to identify acceptable product offered for sale to customers in the relevant market and to identify non-conforming, unacceptable product, which is rejected and considered unusable. Furthermore, the methods well known in the art endeavor to minimize the variance of manufactured products critical characteristics from a target or nominal value. However, the present invention is based upon the premise that there is no added value in minimizing the variance of the critical characteristics from the nominal or target value, provided the critical characteristics are within the established operating range. An objective of the present invention is to establish an operating range that is bound by the points of diminishing returns for the critical characteristics of the manufactured product.

It would be advantageous to provide a means for manufacturing a product whose quality does not exceed the customer's needs and whose price does not exceed that which the customer is willing to pay. Accordingly, another objective of this invention is to provide a means for manufacturing products whose critical characteristics are such that the quality demands of the customers in the relevant job are met, while production costs are minimized. Moreover, an additional objective of this invention is to provide a manufacturing process for establishing optimal operating limits for the critical characteristics of manufactured products.

SUMMARY OF THE INVENTION

In accordance with the present invention there is provided a manufacturing process for establishing optimal operating limits, which are a percentage of a specified tolerance, for the critical characteristics of manufactured products, comprising the steps of: selecting an operating range based on a percentage of tolerance for the critical characteristics of the manufactured product; deciding whether the manufacturing apparatus is capable of operating within this range of tolerance based on historical manufacturing data; manufacturing the products utilizing a material and within the operating range; measuring the critical characteristics of the manufactured products; evaluating the material fitness and manufacturing capability; auditing the manufacturing step to verify that product critical characteristics are maintained within the operating range; rejecting products that have nonconforming critical characteristics; and reassessing the operating range to verify that the manufacturing step is being optimally performed.

BRIEF DESCRIPTION OF THE DRAWINGS

Reference is now made to the drawings which illustrate the best known mode of carrying out the invention.

DETAILED DESCRIPTION

Figure 1:
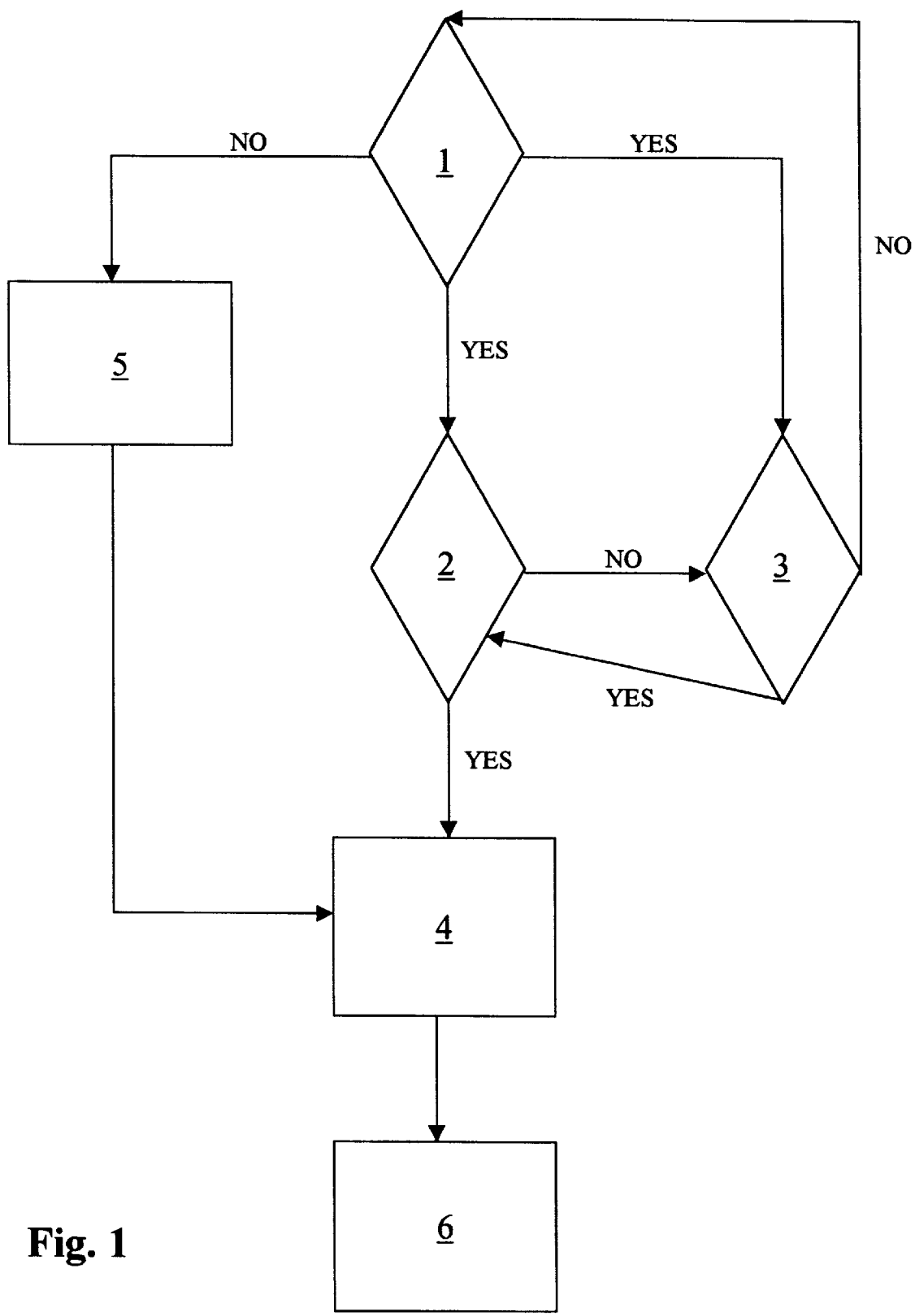
FIG. 1 is a block diagram of one embodiment of the present invention, showing the decision-making process.

FIG. 1 depicts one embodiment of a manufacturing process for the manufacture of products whose critical characteristics are within a range of tolerance established by the executive decision-maker 1. Preferably, the manufacturing process is carried out by an executive decision-maker 1, an operator 2 and a design engineer 3. However, the present invention may be implemented using software and a computer system, having at least one computer or a plurality of microcomputers, where the executive decision-maker 1 is software logic, and the operator 2 and design engineer 3 steps include accessing data-banks of information or data. For example, the executive decision-maker may be neural network software such as RBF-DDA or ARTMAP. One application is shown in U.S. Pat. No. 5,566,092 which contains a good description of a neural network in a manufacturing environment. Exemplary databanks are hereinafter described. The executive 1 in charge of the operation is responsible for establishing the tolerance range for the critical characteristics of the manufactured product.

The executive 1 accesses historical manufacturing process data, customer-originating information relating to customer satisfaction, information regarding the competitors' products, information regarding machine capability, information regarding material capability, information from the company's stockholders, product testing information, equipment pricing information, marketing information to determine the appropriate operating range for the critical characteristics of the manufactured product. This operating range is generally based upon a percentage of blue-print tolerances or specification limits and is defined by an upper and lower efficiency statistical process control (ESPC) limit. The objective of the present invention is to establish an operating range whose limits are defined by the points of diminishing returns for the critical characteristics of the manufactured product.

After the executive 1 determines the operating range, the machine operator 2 performing the manufacturing step 4 is instructed to operate the process to manufacture products whose critical characteristics are within the upper and lower ESPC limits. Furthermore, the machine operator 2 must reject all products whose critical characteristics do not fall within the upper and lower ESPC limits, as provided by the executive step 1.

If the machine operator 2 determines, based upon the historical performance of the equipment or the machine, that the equipment or machine is incapable of manufacturing products within the operating range established by the executive step 1, the machine operator 2 may appeal to the design engineer 3 to expand the operating range, defined by the upper and lower ESPC limits. Furthermore, if the machine operator 2 determines that the equipment or machine is capable of manufacturing products within a tighter operating range than the range determined by the executive step 1, the machine operator 2 may appeal to the design engineer 3 to restrict the operating range defined by the upper and lower ESPC limits. The machine operator 2 may also determine the machine capability by running sample groups to determine the measure of critical characteristics of the product which may be consistently achieved by the machine or equipment.

In the event that the machine operator 2 appeals to the design engineer 3 to adjust the upper and lower ESPC limits, the design engineer 3 may adjust these limits, thereby expanding or restricting the operating range. The design engineer 3 is vested with the authority to expand or restrict the operating range as he sees fit. However, once the design engineer has adjusted the operating range during a particular production schedule or before a particular production schedule is run, the design engineer 3 may adjust the operating range again during that particular schedule or the following schedule only if permission is granted by the executive 1.

If the design engineer 3 agrees that the operating range should be expanded or restricted, he will provide the executive 1 any information obtained from the machine operator 2 to support the decision to expand or restrict the operating range, along with his own information, i.e., research, calculations, etc. If the design engineer 3 denies the machine operator's 2 appeal, the machine operator 2 may appeal directly to the executive 1. If the executive 1 agrees with the machine operator 2 and authorizes the expansion or restriction of the operating range, he may order the design engineer 3 to approve the machine operator's 2 appeal. The machine operator 2 may then operate the equipment or machinery within the new operating range authorized by the executive 1.

If the machine operator 2 appeals to the design engineer 3 to expand the ESPC limits on the grounds that the existing equipment or machine is incapable of performing within the operating range established by the executive 1, the executive 1 may decide either to invest capital for improvements to the existing machines or equipment or to invest capital to replace the existing machines or equipment. The executive 1 may also decide to out-source the manufacturing step to an external supplier or independent contractor 5.

The machine operator 2 may appeal as many times as he deems necessary to have the operating range adjusted. However, until the machine operator is authorized to expand or restrict the operating range by the executive 1 or the design engineer 3, he must continue to reject any products whose critical characteristics are beyond the operating range limits. The machine operator's 2 failure to reject all non-conforming products may be grounds for dismissal.

Once the operating ranges are established, the machine operator 2 must carry out the manufacturing step 4 in accordance with the operating range established by the executive 1 or the design engineer 3. The products whose critical characteristics are within the established operating range are sold to the customers 6 in the relevant market, while the non-conforming products are rejected.

As time goes on, the executive 1 continuously accesses historical manufacturing process data, customer-originating information relating to customer satisfaction, information regarding the competitors' products, information regarding machine capability, information regarding material capability, information from the company's stockholders, product testing information, equipment pricing information, marketing information and uses this information to reassess whether the operating ranges of the manufacturing process are at their optimal levels or, more specifically, whether the ESPC limits are at the critical characteristics' points of diminishing return. The executive 1 also compares his product to his competitors' products based upon approved sampling systems and statistical methods, to determining the quality of his product relative to the competition. The executive 1 may choose to make a product of less quality and lower price than his competitors' product, while still satisfying the demands of the customers in the relevant market, and thereby gain a competitive edge. On the other hand, the executive 1 also may choose to make a higher quality, more expensive product than his competitors if the customer-originating and marketing information dictates that such a decision would be competitively advantageous. The steps embodying the present invention provide the executive 1 with a means for adjusting the quality of the manufactured products by expanding or restricting the ESPC limits accordingly.

Figure 2:
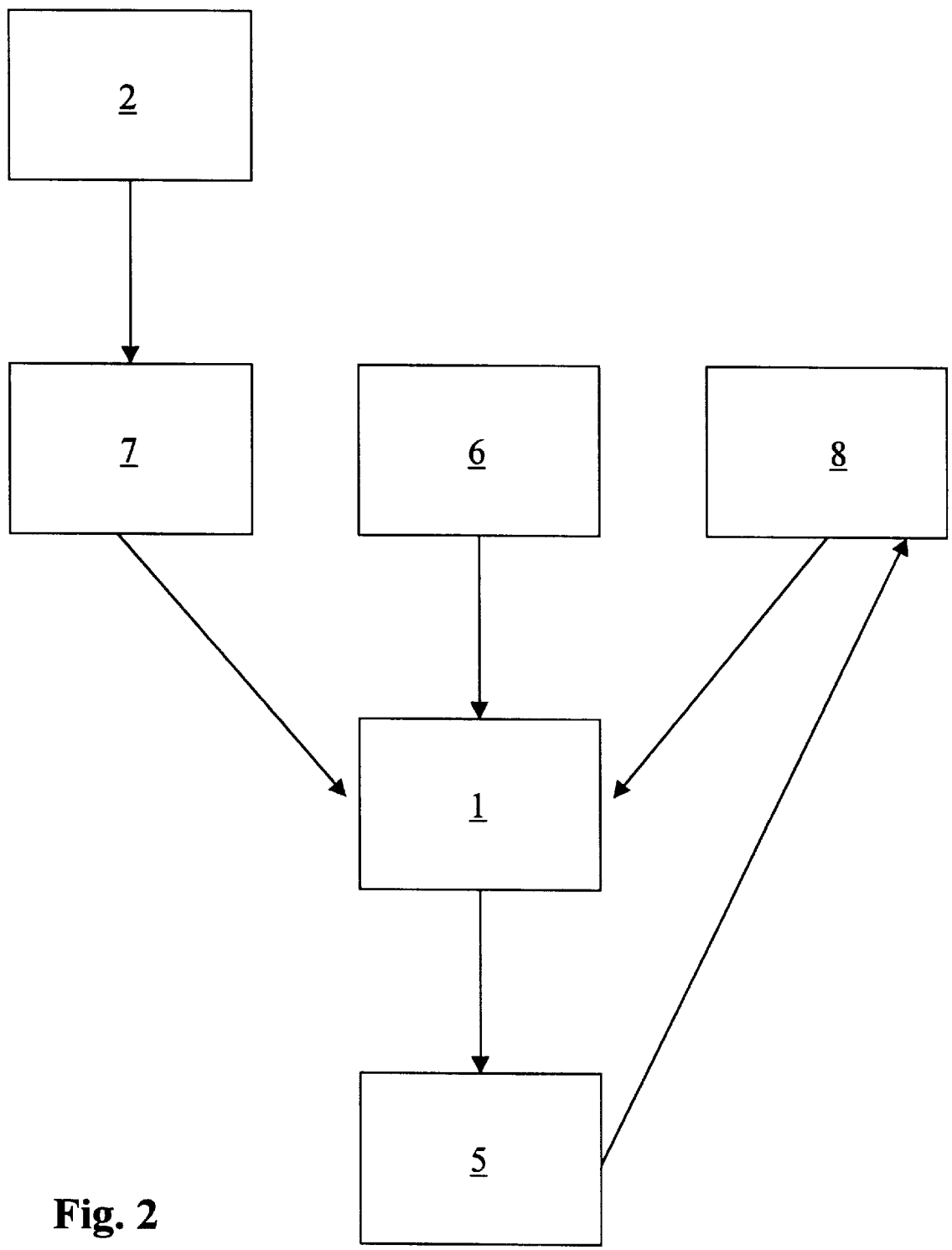
FIG. 2 is a block diagram of one embodiment of the present invention, showing the exchange of information in the process.
Figure 3:
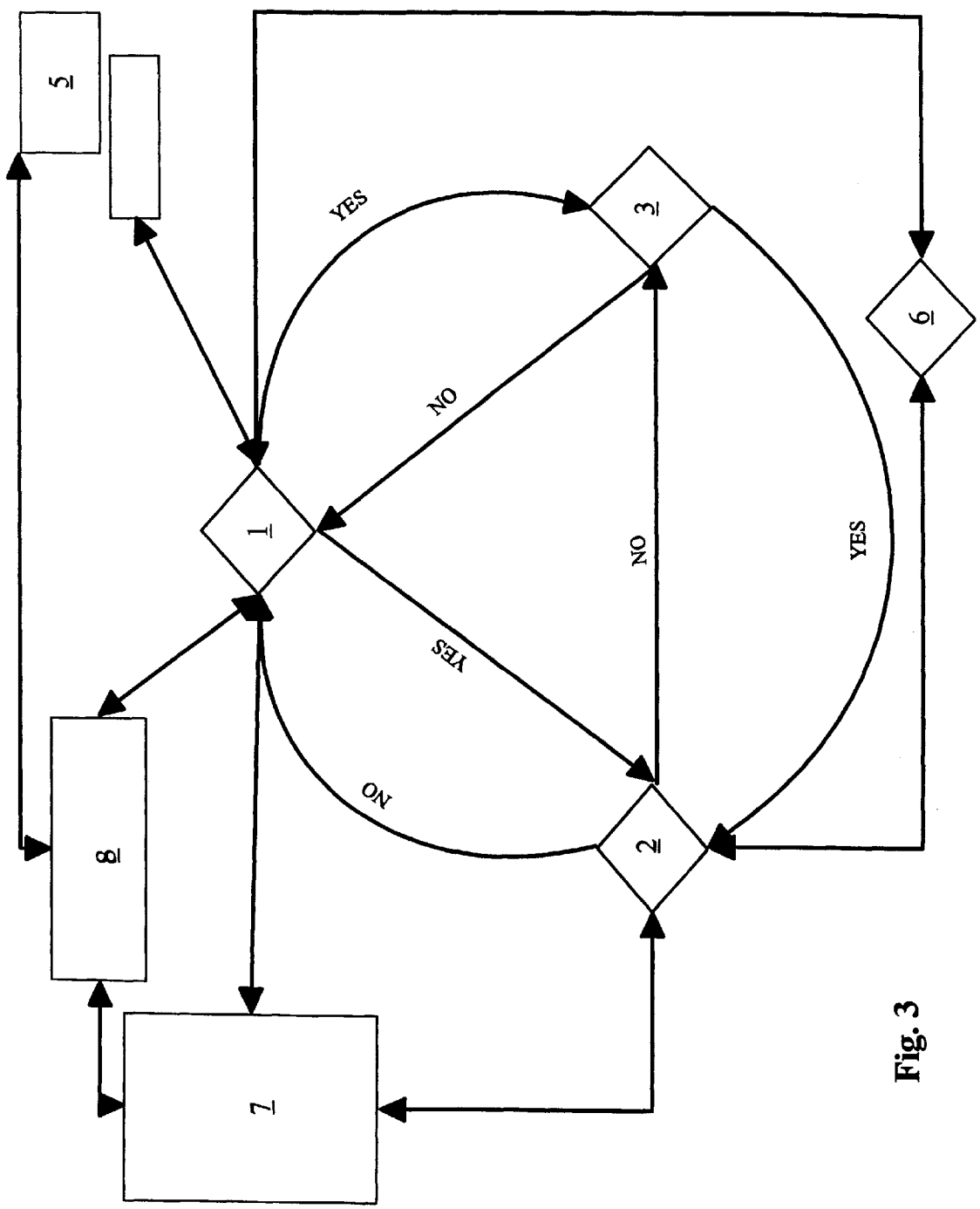
FIG. 3 is a block diagram of the best known mode for carrying out the present invention.

FIG. 2 is a block diagram showing the exchange of information in one embodiment of the present invention. The operator is charged with the responsibility of recording the critical characteristics of the manufactured products. The machine operator 2 must accurately record this information for the purpose of establishing a historical database 7, which is conveyed to or accessed by the executive 1 for evaluating material and/or machine capability and for determining whether the operating range should be expanded or restricted. The executive 1 accesses the internal information 7 included in this historical database, customer-originating information 6 relating to customer satisfaction, information regarding the competitors' products, information regarding machine capability, information regarding material capability, information from the company's stockholders, product testing information, equipment pricing information, marketing information, and supplier quality information from purchasing 8 as a basis for establishing the operating ranges for the critical characteristics of the manufactured products. The executive 1 also accesses this information to determine the specifications for the raw materials to be used in the manufacturing process. The specifications of the raw materials desired and the quantity of materials is communicated by the executive to the supplier 5. The supplier 5, in turn, provides purchasing 8 with pricing and availability information of the raw materials. The executive 1 accesses the pricing and availability information and takes this information into consideration when establishing the ESPC limits for the manufacturing process.

An auditing system is also used to ensure that the machine operator 2 is accurately recording the critical characteristics of the manufactured products. This auditing step may be performed by an individual auditor who measures the critical characteristics of the manufactured product through sampling and verifies that the machine operator has accurately recorded the critical characteristic data.

The steps embodying the present invention are applicable for all manufacturing, machining, chemical and other types of industrial processes.

Another objective is to provide a means for the production of manufactured products whose lifetime does not exceed that which is required or desired by the customer in the relevant market. For example, for a machine that is comprised of a plurality of manufactured parts, it is desirable to have uniformity of the lifetime for each manufactured part. Otherwise, the customer 6 will be paying for use of particular parts of the machine which outlives the usefulness of the machine as a whole. Therefore, the present invention provides a means to evaluate the critical characteristics of a particular product and to manufacture the product in such a way that the quality of the particular parts can be adjusted to conform to the specific needs of the customer 6, allowing the customer 6 to avoid paying for undesired or unnecessary extended life of manufactured products.

Other objects, features and advantages will be apparent to those skilled in the art. While preferred embodiments of the present invention have been illustrated and described, this has been by way of illustration and the invention should not be limited except as required by the scope of the appended claims.

I claim:

1. A manufacturing process for establishing optimal operating limits, which are a percentage of a specified tolerance, for the critical characteristics of manufactured products, comprising the steps of:

selecting an operating range based on a percentage of tolerance for the critical characteristics of the manufactured product;

deciding whether a manufacturing apparatus is capable of operating within this range of tolerance based on historical manufacturing data;

manufacturing the products utilizing a material and within the operating range;

measuring the critical characteristics of the manufactured products;

evaluating the material's fitness and manufacturing capability;

auditing the manufacturing step to verify that product critical characteristics are maintained within the operating range;

rejecting products that have non-conforming critical characteristics; and reassessing the operating range to verify that the manufacturing step is being optimally performed.

2. A manufacturing process according to claim 1, wherein said operating range is determined by an executive decision-maker.

3. A manufacturing process according to claim 2, wherein said executive decision step accesses historical manufacturing process data to determine said operating range.

4. A manufacturing process according to claim 2, wherein said executive decision step accesses information relating to customer satisfaction to determine said operating range.

5. A manufacturing process according to claim 2, wherein said executive decision step accesses information regarding competitors' product to determine said operating range.

6. A manufacturing process according to claim 2, wherein said executive decision step accesses machine capability information to determine said operating range.

7. A manufacturing process according to claim 2, wherein said executive decision step accesses information regarding material capability information to determine said operating range.

8. A manufacturing process according to claim 2, wherein said executive decision step accesses financial information to determine said operating range.

9. A manufacturing process according to claim 2, wherein said executive decision step accesses product testing information to determine said operating range.

10. A manufacturing process according to claim 2, wherein said executive decision step accesses equipment pricing information to determine said operating range.

11. A manufacturing process according to claim 2, wherein said executive decision step accesses marketing information to determine said operating range.

12. A manufacturing process according to claim 1, wherein said operating range is defined by an upper and lower efficiency statistical process control (ESPC) limit.

13. A manufacturing process according to claim 1, wherein the step of establishing an operating range includes providing an operator of the manufacturing step with the operating range.

14. A manufacturing process according to claim 1, wherein said step of deciding whether the manufacturing apparatus is capable of operating within the operating range is carried out by an operator of the manufacturing step.

15. A manufacturing process according to claim 14, including the step of the operator of the manufacturing step running the process within the operating range given by the executive, if the machine is capable of manufacturing products within the operating range.

16. A manufacturing process according to claim 14, including the step of the operator of the manufacturing step rejecting all manufactured products whose critical characteristics are not within the operating range.

17. A manufacturing process according to claim 14, including the step of the operator of the manufacturing step appealing to a design engineer to expand or tighten the operating range.

18. A manufacturing process according to claim 17, including the step of the design engineer evaluating the process design and determining whether the operating range should be expanded or tightened.

19. A manufacturing process according to claim 17, including the step of the design engineer expanding or tightening the operating range, in response to the appeal of the operator of the manufacturing step.

20. A manufacturing process according to claim 17, including the step of the design engineer appealing to an executive decision-maker to expand or tighten an operating range.

21. A manufacturing process according to claim 17, including the step of the executive decision-maker ordering the operator of the manufacturing step to expand or tighten the operating range in accordance with the appeal of the design engineer.

22. A manufacturing process according to claim 17, including the step of the executive decision-maker outsourcing the manufacturing of the product if the executive agrees with the machine operator and the design engineer that running the process within the operating range limits is impossible.

23. A manufacturing process according to claim 17, including the step of the executive decision-maker ordering the operator of the manufacturing step to run the process within the established operating range.

24. A manufacturing process according to claim 1, including the step of the operator of the manufacturing step measuring the critical characteristics of the manufactured product.

25. A manufacturing process according to claim 1, including the step of recording the measurements of critical characteristics of the manufactured product.

26. A manufacturing process according to claim 25, including the step of auditing the manufacturing process to ensure the manufacturing process is running within the selected operation range.

27. A manufacturing process according to claim 12, including the step of analyzing and evaluating machine capability by running sample groups of critical characteristics and comparing them to former sample groups to determine if there is significant variation requiring adjustment of the ESPC limits, outsourcing the process to a supplier, purchasing new equipment or machines, or utilizing different raw materials.

* * * * *